April 1, 1958 M. F. DE WOLF ET AL 2,828,584
MACHINE FOR FORMING AND TESTING TOOTHED PARTS
Filed June 29, 1956 5 Sheets-Sheet 1

INVENTORS
MYRON F. DE WOLF
MARTIN A. DONOHOE
JOHN E. MATTOX

BY Richard W. Treverton
ATTORNEY

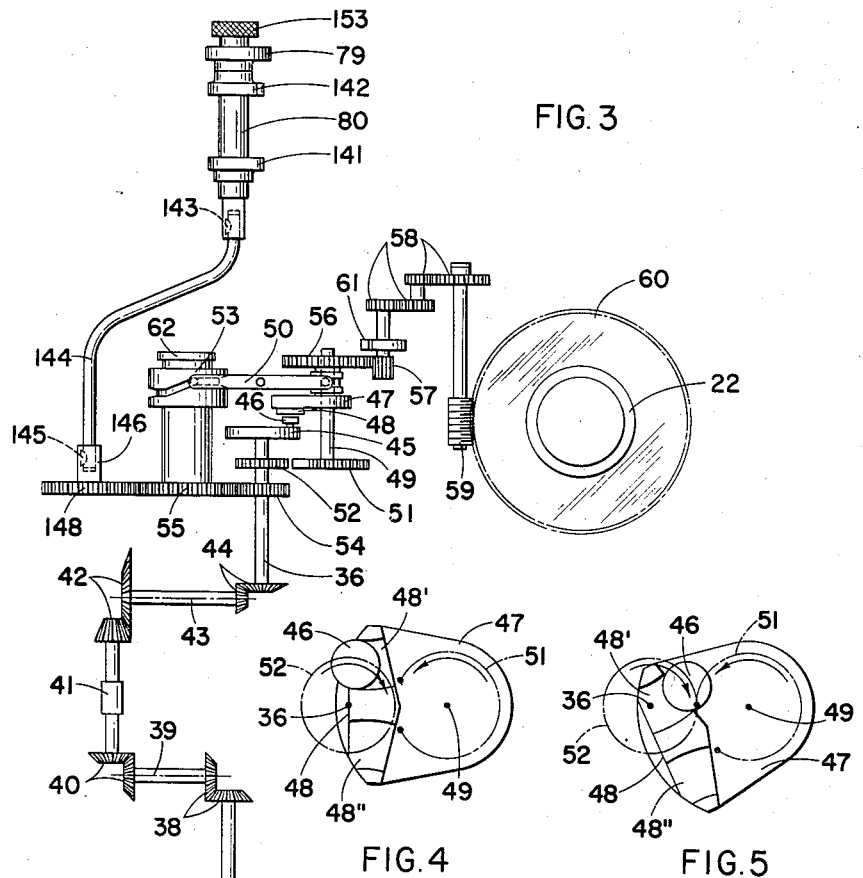
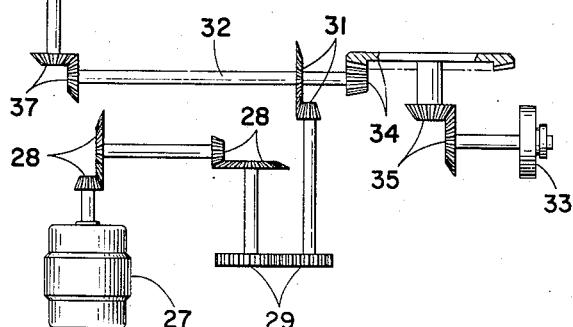

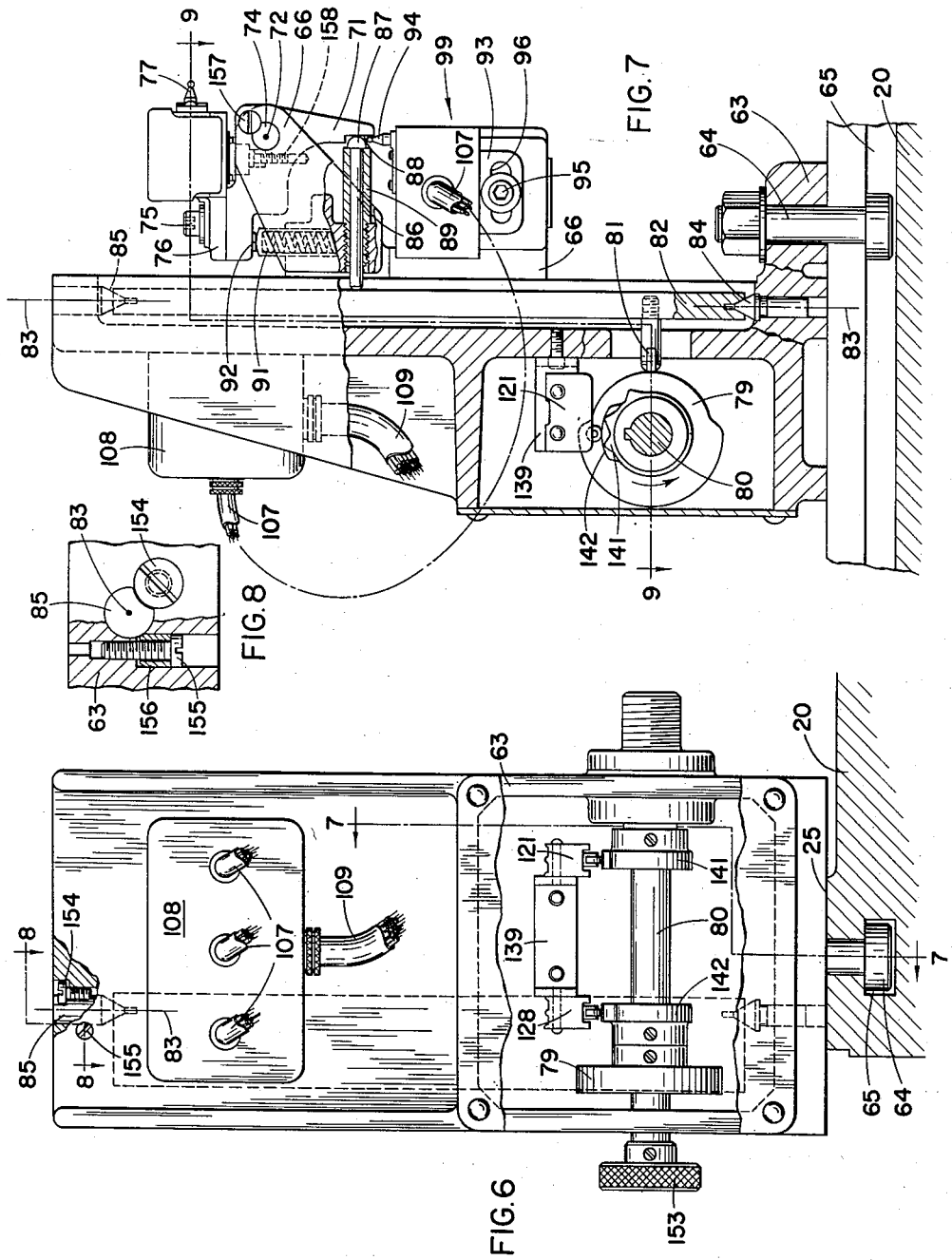

April 1, 1958  M. F. DE WOLF ET AL  2,828,584
MACHINE FOR FORMING AND TESTING TOOTHED PARTS
Filed June 29, 1956  5 Sheets-Sheet 4

April 1, 1958   M. F. DE WOLF ET AL   2,828,584
MACHINE FOR FORMING AND TESTING TOOTHED PARTS
Filed June 29, 1956   5 Sheets-Sheet 5

United States Patent Office 2,828,584
Patented Apr. 1, 1958

2,828,584

MACHINE FOR FORMING AND TESTING TOOTHED PARTS

Myron F. De Wolf, Penfield, and Martin A. Donohue and John E. Mattox, Rochester, N. Y., assignors to The Gleason Works, Rochester, N. Y., a corporation of New York Application June 29, 1956, Serial No. 594,874

11 Claims. (Cl. 51—34)

The present invention relates to machines for forming toothed parts, such for example as clutch or coupling members, and has particular relation to means for testing such parts without removing them from the machines.

In the manufacture of large parts of this kind, such for example as the rotor discs of gas turbines, the practice has been to remove the parts from the tooth grinding machine for checking them on a suitable test stand. If such checking discloses that the teeth of a part are not accurate within acceptable tolerances, the part must be remounted on the grinding machine and subjected to a further grinding operation. This involves considerable time, especially where the parts are heavy and cumbersome and where the allowable tolerances are small, for it is then difficult to accurately replace the part in its original relationship in the machine.

The present invention provides a means for testing the part while it is on the machine and, preferably, making a record which will show the magnitude and location of any error of tooth spacing, tooth thickness, or eccentricity. When this information is available the source of the error can be located and a corrective regrinding can be effected without ever removing the part from the machine.

A machine in accordance with the invention comprises a frame member, a work support movable on said member between a work-forming position and a work-testing position, a work spindle rotatable in said support, a power-operated index drive for intermittently rotating said spindle, tool means on said member for forming teeth on a toothed part on the work spindle when the work support is in said work-forming position, and means to effect relative advance and withdrawal of the tool means and the work spindle in time with operation of the index mechanism, said machine being characterized by having a gage bracket member carrying a pair of gages that are engageable respectively with opposite tooth sides of the part when the work support is in said work-testing position, said bracket member being movable relative to the frame member between a first position in which said gages operatively engage said opposite tooth sides and a second position in which they are clear of the part, and means operable by said index drive for effecting such movement of said bracket member in time with the intermittent rotation of said spindle.

In order to avoid the possibility of erroneous readings of the gages resulting from the bracket member which carries them not always being returned to the intended "first position," the machine preferably has a third gage, supported on either the frame member or the bracket member, for engaging an abutment on the other one thereof when the bracket member is in said first position.

A cam driven by the machine's index drive is preferably employed to move the gage bracket member between its first and second positions, and another cam, which may rotate in unison with the first-mentioned cam, may be provided to actuate a switch to successively connect the gages to the recording device. Accordingly the recording device may be of the single-channel type and yet serve to make a record of the readings of all three gages. Still a third cam, rotatable in unison with the other two, may be arranged to control the chart drive motor of the recorder, so that the chart will advance only while the gages are in operative position.

The foregoing and other objects and advantages will be understood from the following description of the preferred embodiment of the invention shown in the accompanying drawings, wherein:

Fig. 3 is a diagram of the drive train of the machine;

Figs. 4 and 5 are diagrammatic views of the index mechanism of the drive train, showing the same in two different phases of operation;

Fig. 6 is a view partly in elevation and partly in plane 6—6 of Fig. 1, showing the gage supporting structure of the machine;

Fig. 7 is a view partly in side elevation and partly in vertical section in the plane 7—7 of Fig. 6;

Fig. 8 is a detail sectional view in plane 8—8 of Fig. 6;

Figure 1:
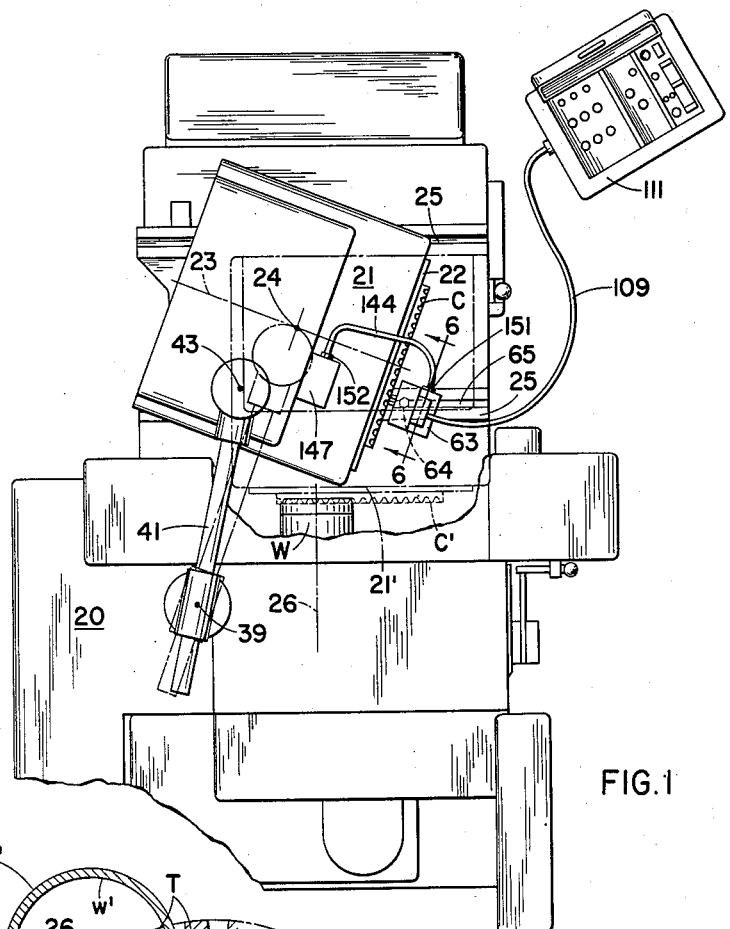
Fig. 1 is a plan view of the machine.

The machine has a frame member 20 adjustably supporting a work support 21. In this support a work spindle 22 is journaled for rotation about a horizontal axis 23, the spindle having secured to its face the part that is to be ground which in this case is a face toothed clutch member C. The work support is adjustable about a vertical axis 24 upon a slide (not shown) which in turn is adjustable horizontally along ways 25 on a sliding base which is adjustable horizontally on the frame member 20 in a direction perpendicular to ways 25. By these adjustments the work support 21 and the workpiece C may be moved between the testing position in which they appear in full lines in Fig. 1 and a grinding or work position in which they are shown by broken lines 21' and C', respectively. When in the work position the part is engaged by an annular cutter W, which may be either a cup-shaped wheel or a face mill type of bladed cutter, and which is rotatable on the machine about axis 26 and is periodically retracted from the part C' along this axis to permit tooth-to-tooth indexing of the part.

Figure 2:
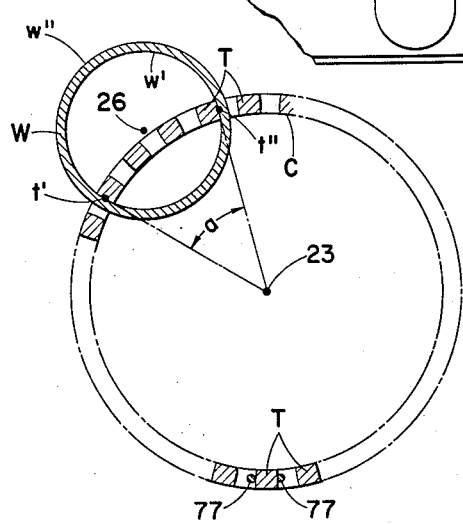
Fig. 2 is a diagram showing the relationship between a toothed part being produced and the grinding tool and gage elements of the machine.

One method of grinding which may be carried out on the machine is illustrated in Fig. 2. The surfaces of the wheel W which produce the sides of the teeth T on part C are conical, the inside one of these surfaces $w'$ simultaneously engaging the opposite sides $t'$ and $t''$ of two spaced teeth T. The wheel is fed axially into full depth to grind these surfaces $t'$ and $t''$, then is withdrawn and the part C is indexed by one pitch. The process is repeated until all of the teeth have been ground. A mating clutch member, not shown, may have its teeth ground to complementary shape by the outside conical surface $w''$ of another wheel—a wheel whose outside conical surface has the same mean diameter as the inside surface $w'$ of the wheel shown in Fig. 2.

The drive train of the machine, shown in Fig. 3, is driven from a motor 27, the wheel W preferably being driven by a separate motor, not shown. Motor 27 acts through bevel reduction gears 28, cycle-time change gears 29, and bevel gears 31 to drive a main shaft 32 journaled in frame 20. A cam 33, whose shaft is also journaled in frame 20, and whose function is to periodically withdraw and advance the wheel W along its axis 26, is driven from shaft 32 through bevel gears 34 and 35. An index drive shaft 36 journaled in work support 21 is also driven from shaft 32, through bevel gears 37 and 38, a vertical shaft journaled in frame 20 and whose axis is 39, bevel gears 40, overhead telescoping shaft 41 (see also Fig. 1), bevel gears 42, a vertical shaft journaled in work support 21 whose axis is 43, and bevel gears 44.

The index drive comprises a drive member 45 carrying a roller 46, and a driven member 47 having a portion 48 which has two slots 48' and 48" for periodically receiving the roller. Affixed to a shaft 49, to which the driven member 47 is splined, there is a gear segment 51 adapted to mesh intermittently with a pinion 52 on shaft 36. A cam 53 driven by gears 54, 55 at one-half the speed of shaft 36, acts through a shifter lever 50 to shift assembly 47, 49, 56 axially to and from a position wherein slotted portion 48 is in the plane of revolution of roller 46.

The index action is that once every two turns of shaft 36, i. e. once for each turn of cam 33, and at a time when the cam 33 has withdrawn the wheel W from the work, the cam 53 shifts driven member 47 axially along shaft 49 to bring slotted part 48 into the plane of roller 46. As shaft 36 then rotates, clockwise in Figs. 4 and 5, the roller enters tangentially into the outer end of slot 48' (the position shown in Fig. 4) and accelerates the member 47 to a certain maximum velocity, in a counterclockwise direction in Figs. 4 and 5. At this instant (the position shown in Fig. 5) the roller leaves the inner end of slot 48' and the pinion 52 makes driving contact with the first tooth of gear segment 51. There follows a period of constant velocity drive of shaft 49 through the gears 52, 51. At the conclusion of this period the pinion 52 disengages the last tooth of segment 51 and at the same instant the roller 46 enters into the inner end of slot 48" (a position of opposite hand to Fig. 5 with respect to the plane of symmetry which contains the axes of shafts 36 and 49), and, as the roller continues to revolve, it decelerates the member 47 to a standstill. At the instant the member 47 is stopped the roller is departing from the outer end of slot 48" (a position of opposite hand to Fig. 4). The cam 53 then acts to shift the assembly 47, 48, 56 to the position shown in Fig. 3, wherein the part 48 is out of the planes of roller 46, so that the latter turns idly; and, indexing being concluded, the cam 33 acts to feed the abrasive wheel axially into the workpiece.

The intermittent indexing motion of shaft 49 is transmitted to the work spindle 22 through speed-up gears 56 and 57, index change gears 58 which determine the angle through which the work spindle is turned during each indexing action, and final reduction gearing comprising worm 59 and worm wheel 60. When indexing action is not occurring the work spindle 22 is positively held against rotation, this being accomplished by a spring-backed pivoted lock dog, not shown, which engages in a notch in a lock-up plate 61 affixed to the shaft of pinion 57. A cam 62, co-rotatable with cam 53, acts to disengage the dog from the notch just prior to indexing and to allow it to re-engage immediately at the conclusion of indexing.

Figure 9:
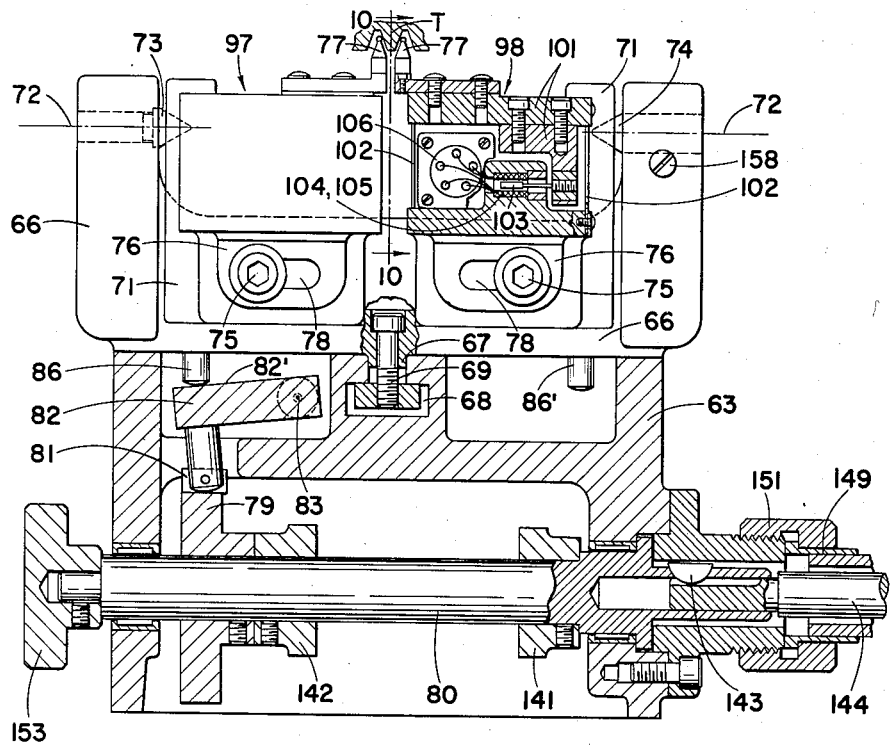
Fig. 9 is a plan sectional view, primarily in planes 9—9 of Fig. 7.

According to the present invention a gage support 63, Figs. 1, 6, 7 and 9, is removably and adjustably supported on one way 25 of frame 20 by a bolt 64 whose head is anchored in the T-slot 65 in the way. Adjustable vertically along one face of support 63 is a slide 66, the slide having a tongue 67 engaging in a vertical T-slot 68 in the support, Fig. 9, and being secured by a bolt 69 whose nut is confined within the slot. A gage-carrying bracket 71 is pivoted to the slide on a horizontal axis 72 by means of centers 73 and 74 whose conical tips are engaged in complementary recesses in the bracket. Secured to the bracket by screws 75 are the frames 76 of a pair of gages which are of similar construction but of opposite hand. Each gage has a probe 77 for engaging a tooth T of the part C, as indicated in Figs. 2 and 9. In order to adapt the apparatus for different tooth thicknesses the gage frames have elongated openings 78, Fig. 9, which pass the screws 75 and enable lateral adjustment.

The bracket 71 is periodically pivoted about axis 72, counterclockwise in Fig. 7, to withdraw the probes 77 from the part C in order to permit tooth-to-tooth indexing. This pivotal motion is effected by a cam 79 affixed to a shaft 80 that is journaled for rotation in support 63. The cam engages rocker 81 of a cam follower 82 that is pivoted to the support 63 on vertical axis 83 by a means of conical centers 84 and 85, Fig. 7. The follower in turn abuts the end of a pin 86 whose head 87 abuts surface 88 of the bracket 71. The pin is slidable in a sleeve 89 which constitutes a part of the slide 66, and the head 87 of the pin abuts the outer end of this sleeve to determine the advance limit position of the bracket, that is, the limit position of clockwise motion in Fig. 7. In this position the cam follower rocker 81 is slightly spaced from the cam 79. A spring-backed plunger 91 carried by the slide constantly presses against surface 92 of the bracket, thereby urging it to this limit position. Inasmuch as the surface 82' of follower 82, and the axis 83 about which the follower pivots, are parallel to the path of vertical adjustment of the slide 66 on the support 63, such adjustment does not affect operation of the bracket 71 by the cam. When dealing with parts C of very large diameter it is desirable to invert the slide 66 with respect to the support 63, since this enables the probes 77 to be positioned lower than is possible merely by lowering the slide (see Fig. 7). To enable the gage bracket 71 to be operated by follower 82 when the slide is inverted, the pin 86 is duplicated, as indicated at 86' in Fig. 9. It will be understood that when the slide is inverted pin 86' will be in the same position with respect to follower surface 82' as that in which the pin 86 appears in Fig. 9. An additional surface 88, not shown, is provided on the bracket 71 for abutting the head of the pin 86'.

In order to indicate whether or not the bracket is in its advanced limit position, a third gage is provided. This gage has a frame 93, Fig. 7, and a probe 94 adapted to engage surface 88 of the bracket. To enable fore-and-aft adjustment of this gage, the screw 95 which secures it to the slide 66 extends through an elongated opening 96 in the gage frame.

The two gages having probes 77 are designated 97 and 98 respectively, while the third gage, whose probe is 94, is designated 99. These three gages are essentially alike in construction, each comprising a multipart probe support 101, Figs. 9 and 10, which is preferably made of a light metal such as aluminum and is connected by four leaf springs 102 to the gage frame, 76 or 93, which is made of non-magnetic material, preferably bronze. Carried by this support 101 is the iron core or armature 103, Figs. 9 and 12, of a transformer whose primary winding 104 and opposed secondary windings 105 are supported on the gage frame, 76 or 93. The leads from the coils and a ground wire connected to the gage frame are connected through an insulator 106 and flexible cables 107 to a juncture box 108, Figs. 6 and 7, on gage support 63, and thence through a single cable 109, Fig. 1, to a cabinet 111 containing switching, amplifying and recording apparatus. The details of this apparatus within cabinet 111 form no part of the present invention and any suitable equipment for the purpose indicated may be employed in the combination of the invention.

Figure 13:
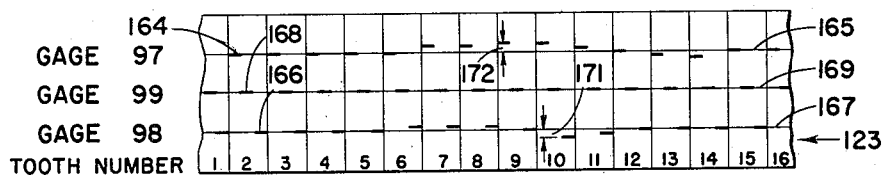
Figure 12:
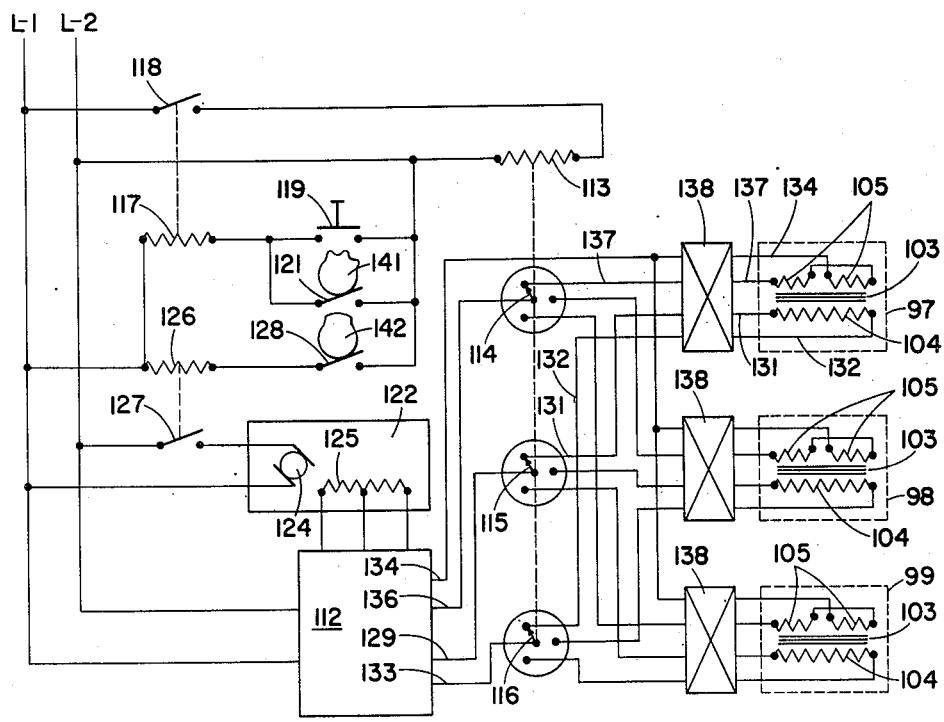
Fig. 12 is a simplified wiring diagram of the gaging and recording devices; and, Figs. 13 to 15, inclusive, illustrate the manner in which the measurements made by the gages appear on the chart of the recording device.

For successively connecting the gages 97, 98 and 99 to the amplifier, designated 112 in Fig. 12, there is provided a stepping switch comprising a solenoid 113 and three co-rotatable switch arms 114, 115 and 116. This solenoid is controlled by a relay whose winding is 117 and whose movable contact is 118. For controlling solenoid winding 117 a manually operated switch 119 and a cam operated switch 121 are arranged in parallel. The recorder, 122, is preferably an oscillograph having a stylus or pen, not shown, operated by the armature of a galvanometer, for marking a moving chart 123, Figs. 13-15, the chart being driven by a motor 124, and the galvanometer windings, 125, being arranged in the output circuit of the amplifier. Current for the system is supplied through leads L-1 and L-2 which extend to the power supply circuit of the amplifier and are connected to the motor 124 upon energization of a motor control relay comprising a winding 126 and a movable contact 127. This relay 126, 127 is controlled by a cam operated switch 128.

When the stepping switch arms 114-116 are in the position shown the amplifier energizes the primary winding 104 of gage 97 through a circuit comprising lead 129, arm 115, lead 131, the primary winding, lead 132, arm 116 and lead 133; and the opposed secondary windings 105 of the gage are connected to the amplifier signal input circuit via lead 134, the amplifier, lead 136, arm 114 and lead 137. The arrangement is such that the value of the input current introduced into the amplifier through leads 134 and 136 corresponds to the displacement of the armature 103 from a neutral position; and that the output current from the amplifier, delivered to the galvanometer coil 125, effects a displacement of the stylus of the recorder proportionate to but greatly magnified with respect to the displacement of the armature. The value of the input current for a given displacement of the armature 103 may be varied by adjustment of variable resistors and capacitors included in a current control network indicated symbolically at 138 and which connects leads 131, 132, 134 and 137. The arrangement of the resistors and capacitors in the network is not a part of the present invention and hence is not illustrated. The connections between the gages 98, 99 and the amplifier and stepping switch are replicas of those described above. Upon each energization of the solenoid 113 the switch arms 114-116 advance 120° so that the gages 97, 98 and 99 are connected successively to the amplifier and recorder.

The switches 121 and 128 are mounted on a block 139, Figs. 6 and 7, on the gage support 63, and they are operated respectively by a three-lobed cam 141 and a single-lobed cam 142, both of these cams being affixed to the shaft 80 and hence being co-rotatable with the cam 79 which acts to withdraw and advance the gage bracket 71. Shaft 80 is detachably connected by a key 143, Figs. 3 and 9, to a flexible shaft 144 which in turn is detachably connected by a key 145 to a shaft 146. The latter is journaled for rotation in a bracket 147, Fig. 1, and is driven in time with the index mechanism by a gear 148 which meshes with gear 55. The flexible shaft 144 is rotatable within a flexible sheath 149 that is detachably connected at one end to the gage support 63 by a coupling 151 and at the opposite end to the bracket 147 by a coupling 152. Shaft 80 also has a knurled knob 153 by which it may be turned manually when it is disconnected from shaft 144.

Referring now to certain mechanical details, as shown in Figs. 6 and 8 the center 85 is adjustable along axis 83 in a bore in bracket 63 by means of an adjusting screw 154 that is threaded into the bracket. After such adjustment, which is made to allow the bracket to pivot as freely as possible without permitting axial or radial play, the center 85 is clamped by tightening a clamp screw 155 against a sleeve 156 to wedge the latter against the center. By means of a similar adjusting screw 157, Fig. 7, and clamp screw 158, Figs. 7 and 9, the center 74 may be adjusted along its axis 72 and then clamped to the vertical slide 66.

Figures 10, 11:
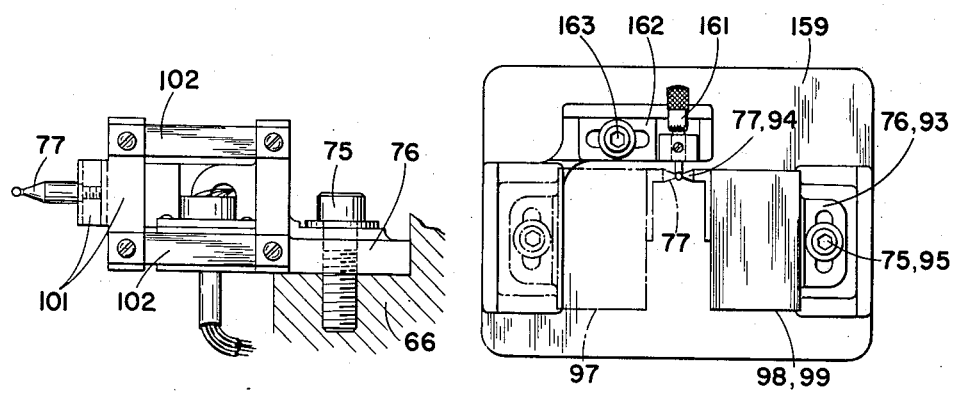
Fig. 10 is an elevational view of one gage unit, viewed from plane 10—10 of Fig. 9.
Fig. 11 is a plan view of device employed to facilitate calibration of the gages.

In setting up the apparatus, the gage units are detached by removing screws 75 and 95 and are mounted, one at a time, on a calibrating stand 159, Fig. 11. A micrometer 161, carried by a slide 162, is adjustable laterally on the stand upon loosening of a clamp screw 163. The gage mounted on the stand may be electrically connected to the amplifier and recorder in the manner shown in Fig. 12, and may be brought into the amplifier circuit by closing the switch 119 one or more times to suitably position the stepping switch 113-116. The gage and slide are first adjusted on the stand to a position in which the springs 102 of the gage are flexed by an amount somewhat greater than the maximum deflection that is expected during the subsequent tooth checking operation, and the balancing network 138 is then adjusted so that for a given adjustment of the micrometer in either direction, i. e. for a given increase or decrease of the flexure of springs 102, the mark made by the stylus will fall above or below the line 165 by a corresponding distance, whose magnitude depends upon the magnification scale that is selected. Gages 98 and 99 are then adjusted in the same manner.

After all three of the gages have been calibrated and replaced on the gage support 63, the latter is adjusted on the machine frame 20 and the slide 66 is adjusted vertically, so that the probes 77 may contact, in the manner shown in Figs. 2 and 9, mean points on opposite sides of a tooth T of a part C that has been cut and then brought into position for testing by swinging work support 21 to its full line position in Fig. 1. The knob 153 is turned manually to advance the bracket 71, and the frame 93 of gage 99 is adjusted on slide 66 until a mark 168 made by the recorder stylus lies on the chart, preferably near zero line 169. Similarly the other gage frames, 76, are adjusted laterally on bracket 71 until the probes 77 contact the tooth sides with sufficient deflection of springs 102 to cause the stylus to mark the chart preferably near the zero lines 165 and 167 when the gages 97 and 98, respectively, are brought into circuit by actuation of the stepping switch by means of switch 119. Next the zero balance control of each network 38 is adjusted to so bias the network output current that the stylus will mark exactly on the appropriate zero line on the chart.

The flexible shaft 144 may now be connected to the shaft 146 by means of coupling 152 (assuming that coupling 151 is already attached to support 63), and the machine operated by running motor 27. During each revolution of cam 33, Fig. 3, the shaft 80 also makes one turn, and the following sequence occurs: Cam 79 pivots follower 81, 82, clockwise in Fig. 9, and thereby retracts the gage bracket 71, swinging the latter counterclockwise in Fig. 7 so that the probes 77 are withdrawn clear of the teeth T. The index mechanism 45, 47 then functions to advance the part C by one pitch. Then the cam 79 allows the spring plunger 92 to advance the bracket 71, causing probe 94 to be engaged by surface 88 and the probes 77 to engage opposite sides of the next tooth T of part C. Next the cam 142 closes switch 128, thereby energizing relay 126, 127 and causing the recorder motor 124 to operate and cause the chart 123 to advance. Then the first lobe of cam 141 closes switch 121, thereby energizing relay 117, 118 and actuating the stepping switch to connect gage 97 to the amplifier and recorder, whereupon the recorder stylus makes one mark 164 on or adjacent line 165. The switch 121 then opens and is almost immediately reclosed by the cam 141, causing advance of the stepping switch to thereby disconnect gage 97 and connect gage 98 to the amplifier and recorder, whereupon the stylus makes a mark 166 on or adjacent line 167. Then switch 121 opens and recloses again, now causing the stepping switch to electrically disconnect gage 98 and connect gage 99, so that the stylus will put a mark 168 on the chart on zero line 169. The cam 142 allows switch 128 to open far enough in advance of the marking along line 167 so that the chart motor will stop at about the same time this marking is ended by reopening of switch 141. One revolution of cam 33 is now completed and a new cycle follows automatically. Operation continues until a record has been made of every tooth of the part C, at which time the machine is stopped, preferably by action of an automatic stop switch such as is ordinarily associated with machines of the type shown.

Figure 14:
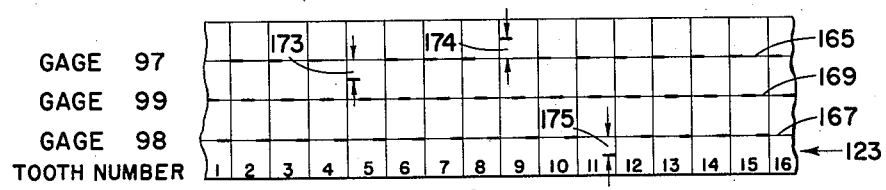
Figure 15:
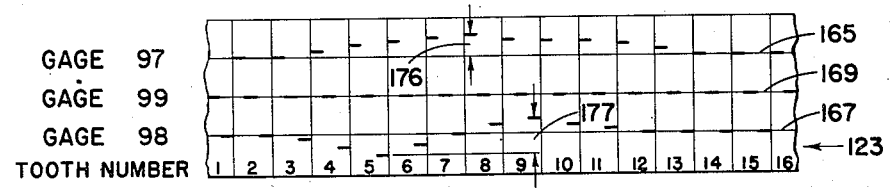

Assuming that the gaging apparatus is functioning properly, the marks 168 should all lie on the zero line 169 of the chart. In a typical case the chart may appear as in Fig. 13, where the maximum tooth-to-tooth error, occurring between the teeth that have been arbitrarily numbered 9 and 10, is an amount 171 which is within the allowed tolerance, and the maximum accumulated error 172, for the other side of tooth number 9, is also within the allowed tolerance. Fig. 14 illustrates another case where the teeth numbered 5, 9 and 11 exhibit spacing errors by amounts designated 173, 174 and 175, respectively, which are greater than the allowed tolerance. Fig. 15 illustrates still another case, in which the accumulated error at 176 on one side of the teeth, and also that at 177 on the other side of the teeth, exceeds the allowed tolerance although the tooth-to-tooth error is within an acceptable range.

Although the gaging apparatus in a sense depends upon the accuracy of the index mechanism of the machine, which effects the tooth-to-tooth advance of the part C during both cutting and testing, errors in this mechanism also may be detected by analysis of the chart. The reason for this is that, as shown in the upper part of Fig. 2, surfaces $t'$ and $t''$ of two different teeth are cut simultaneously, while as shown at the bottom of the same view the opposite surfaces of the same tooth are measured simultaneously. Thus repeated deviations from standard of approximately the same magnitude and direction, of tooth surfaces which are spaced by the same angle $a$ that surfaces $t'$ and $t''$ are spaced, would indicate malfunctioning of the index mechanism.

Having now described the structure and operation of the preferred embodiment of the invention, what we claim as our invention is:

1. A machine for forming and testing toothed parts, comprising a frame member, a work support movable on said member between a work-forming position and a work-testing position, a work spindle rotatable in said support, a power-operated index drive for intermittently rotating said spindle, tool means on said member for forming teeth on a toothed part on the work spindle when the work support is in said work-forming position, and means to effect relative advance and withdrawal of the tool means and the work spindle in time with operation of the index mechanism, said machine being characterized by having a gage bracket member carrying a pair of gages that are engageable respectively with opposite tooth sides of the part when the work support is in said work-testing position, said bracket member being movable relative to the frame member between a first position in which said gages operatively engage said opposite tooth sides and a second position in which they are clear of the part, and means operable by said index drive for effecting such movement of said bracket member in time with the intermittent rotation of said spindle.

2. A machine according to claim 1 in which the tool means comprises a rotary annular cutter arranged to simultaneously cut opposite sides of spaced teeth of the part and said pair of gages are engageable simultaneously with opposite sides of the same tooth of the part.

3. A machine according to claim 1 further characterized by having a third gage on one of said members for engaging an abutment on the other one thereof when said bracket member is in said first position.

4. A machine according to claim 3 further characterized by having a recording device, and switch means operated in time with said index mechanism for consecutively connecting the three gages to the recording device when said bracket member is in said first position.

5. A machine according to claim 4 further characterized in that said recording device has a chart drive motor, and there is a switch means for said motor operated in time with said index mechanism for causing said motor to operate only when said bracket member is in said first position.

6. A machine according to claim 1 further characterized by having a gage support on the frame and to which said bracket member is pivoted for movement between said first and second positions, and by the last-mentioned means comprising a cam rotatable on the gage support for effecting such movement of said bracket member, and means connecting said cam to said index mechanism for rotation thereby.

7. A machine for forming and testing toothed parts comprising a frame member, a work support movable on said member between a work-forming position and a work-testing position, a work spindle rotatable in said support, a power-operated index drive for intermittently rotating said spindle, tool means on said member for forming teeth on a toothed part on the work spindle when the work support is in said work-forming position, and means to effect relative advance and withdrawal of the tool means and the work spindle in time with operation of the index mechanism, said machine being characterized by having a gage support on the frame member, a gage bracket member pivoted to the support for movement between first and second positions, a pair of gages on the bracket member and respectively engageable with opposite tooth sides of the part when the bracket member is in said first position and clear of the part when the bracket member is in said second position, a third gage on one of said members for engaging an abutment on the other one thereof when the bracket member is in said first position, and a cam for effecting said movement of the bracket member, said cam being rotatable on the gage support and being connected with said index mechanism for operation in time therewith.

8. A machine according to claim 7 further characterized by having a recording device, and switch means for consecutively connecting the three gages to the recording device when said bracket member is in said first position, said switch means including a cam rotatable on the gage support in unison with the afore-mentioned cam.

9. A machine according to claim 8 further characterized in that said recording device has a chart drive motor, and there is a further switch means for causing said motor to operate only when said bracket member is in said first position, said further switch means including a cam rotatable on the bracket support in unison with the afore-mentioned cams.

10. A machine according to claim 8 further characterized in that the gage bracket is pivoted on a horizontal axis to a slide, said slide being adjustable vertically on the gage support, a cam follower engageable with the cam for effecting movement of the bracket member to said second position, said follower being pivoted to the gage support on a vertical axis, an element carried by the slide for transmitting motion from the follower to the gage bracket, the surface of the follower that is engageable with said element being parallel to said vertical axis, and resilient means for urging motion of the gage bracket about its pivot axis toward said first position.

11. A machine for testing toothed parts comprising a frame member, a work support on said member, a work spindle rotatable about a horizontal axis in said support, an indexing mechanism for intermittently rotating said spindle, a gage support on said member, a slide adjustable vertically on the gage support, a pair of gages on the bracket adapted to engage respectively opposite tooth sides of a toothed part on the work spindle, a bracket supporting said gages and pivoted to the slide on a horizontal axis for movement between a first position in which the gages engage said tooth sides of the part and a second position in which they are clear of the part, a third gage mounted on the gage support and adapted to engage the bracket when the latter is in said first position, a cam rotatable on the gage support about a horizontal axis and connected to said indexing mechanism for operation in time therewith for moving the bracket to said second position to permit indexing of the toothed part, a cam follower engageable with the cam and pivoted to the gage support about a vertical axis, an element carried by the slide for transmitting motion effected by said cam from the follower to the bracket, the surface of the follower that is engageable with said element being parallel to said vertical axis, and resilient means for urging motion of the bracket about its pivot axis toward said first position.

References Cited in the file of this patent

UNITED STATES PATENTS 2,590,203    Petit ------------------ Mar. 25, 1952

FOREIGN PATENTS 375,893    Germany -------------- May 19, 1923